United States Patent [19]

Sofue

[11] Patent Number: 5,392,274
[45] Date of Patent: Feb. 21, 1995

[54] OPTICAL PICKUP DEVICE

[75] Inventor: Masaaki Sofue, Hadano, Japan

[73] Assignee: Ricoh Company, Ltd., Tokyo, Japan

[21] Appl. No.: 990,720

[22] Filed: Dec. 15, 1992

[30] Foreign Application Priority Data

| Dec. 20, 1991 | [JP] | Japan | 3-354973 |
| Jan. 20, 1992 | [JP] | Japan | 4-007511 |
| Oct. 23, 1992 | [JP] | Japan | 4-286471 |

[51] Int. Cl.$^6$ ............................................. G11B 7/00
[52] U.S. Cl. ................................ 369/110; 369/44.23
[58] Field of Search ............... 369/110, 112, 13, 44.23

[56] References Cited

U.S. PATENT DOCUMENTS

| 4,409,631 | 10/1983 | Matsumoto | 369/110 |
| 5,004,326 | 4/1991 | Sasaki | 369/110 |
| 5,189,651 | 2/1993 | Utsumi | 369/110 |

FOREIGN PATENT DOCUMENTS 1133229 11/1989 Japan .

Primary Examiner—Paul M. Dzierzynski
Assistant Examiner—Kiet T. Nguyen
Attorney, Agent, or Firm—Cooper & Dunham

[57] ABSTRACT

In an optical pickup device, signal light is reflected on an optical disk and is converged by a condenser lens. A polarizing plane of the signal light is rotated 45° by a ½ wave plate. The signal light is then incident to a polarizing beam splitter at an incident angle $\theta$. The polarizing beam splitter is constructed by a plane parallel plate having a polarizing coating film. An s-polarized component of light reflected on the polarizing beam splitter is received by first divisional light-receiving elements and a difference signal between outputs of the first divisional light-receiving elements is set to a tracking control signal. A p-polarized component of light transmitted through the polarizing beam splitter is received by second divisional light-receiving elements and a difference signal between outputs of the second divisional light-receiving elements is set to a focusing control signal. Sum signals of the first and second divisional light-receiving elements are respectively inputted to a reproducing signal detector. The reproducing signal detector obtains a reproducing signal of recorded information by calculating a difference between these sum signals.

4 Claims, 9 Drawing Sheets

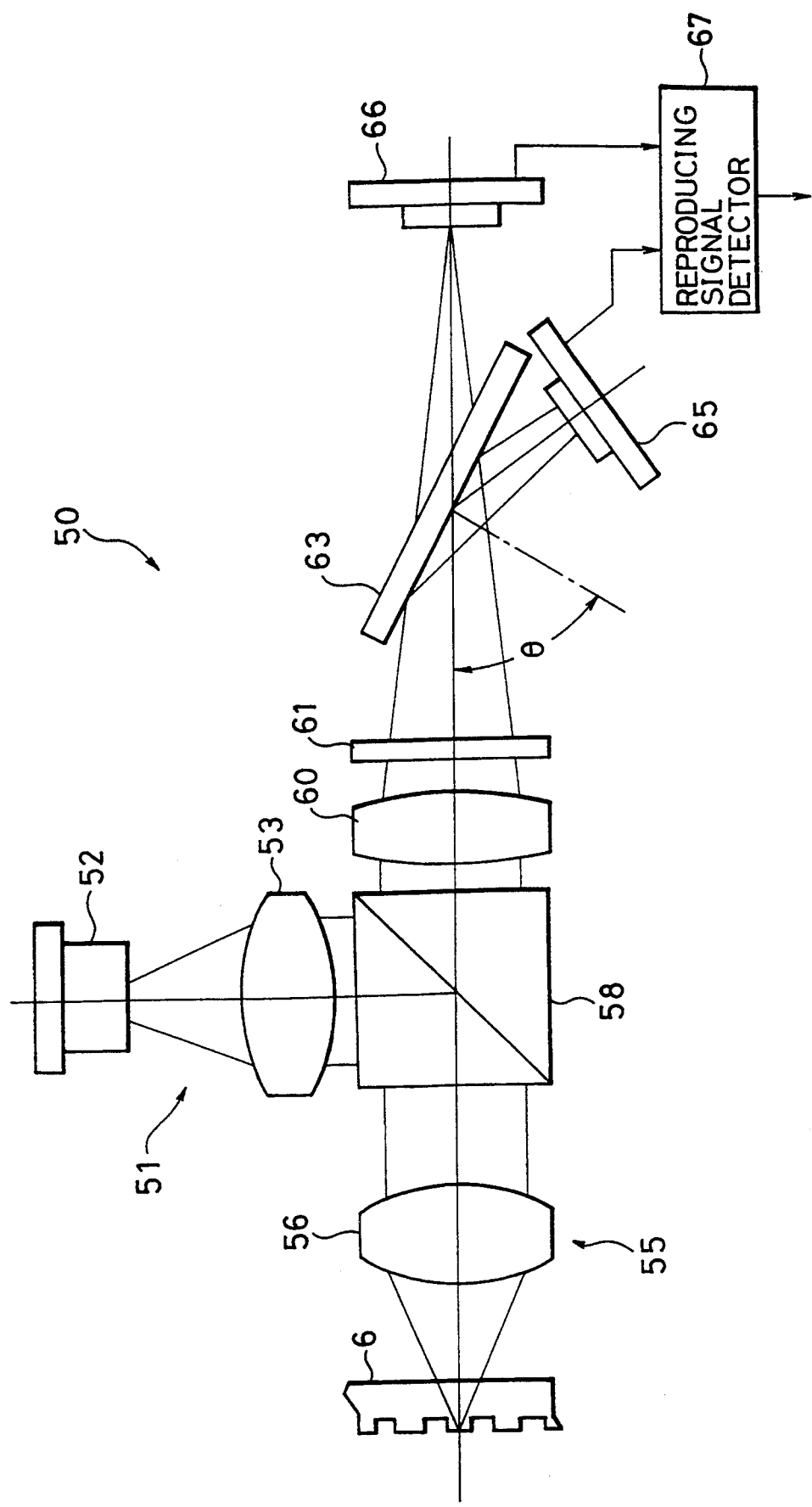

OPTICAL PICKUP DEVICE

BACKGROUND OF THE INVENTION

1. Field of the Invention

The present invention relates to an optical pickup device for recording, reproducing or erasing information by irradiating a laser beam spot to an optical information recording medium. The present invention also relates to a polarizing beam splitter used in this optical pickup device.

2. Description of the Related Art

In a general optical pickup device in an apparatus for recording and reproducing optical information such as an optical disk unit, grooves are spaced apart from each other at a pitch about 1.6 $\mu$m on an optical information recording medium such as magnetooptic disk. In the following description, the optical information recording medium or the magnetooptic disk are respectively called a recording medium or an optical disk. A laser beam is irradiated by an objective lens onto these grooves by changing this laser beam to a spot having a diameter about 1 $\mu$m such that information is recorded, reproduced and erased.

Therefore, it is necessary to irradiate the laser beam spot with an accuracy of about 0.1 $\mu$m on the information recording grooves spaced apart from each other at a pitch about 1.6 $\mu$m, i.e., in the vicinity of the central line of a track while a distance between the recording medium and the objective lens is held and set to be about 4 mm with an accuracy of about 1 $\mu$m.

However, the optical disk is rotated at a high speed such as several thousand revolutions per minute to increase a processing speed. Therefore, a position of the track is changed at a high speed at any time by vibrations of an optical disk surface, a core, etc. Accordingly, focusing control for controlling a movement of the objective lens in the direction of an optical axis and tracking control for controlling a spot position in a radial direction of the disk are performed while the position of the track is detected.

In these focusing and tracking controls, light reflected from the optical disk is generally received by divisional light-receiving elements as typically used in detecting methods such as push-pull method, a critical angle method, an astigmatic method and a knife edge method. A difference in divisional output signal between the divisional light-receiving elements is then calculated and the focusing and tracking controls are generally performed by using this difference signal.

In magnetooptic recording and reproducing operations in which information can be erased and overwritten, the information is recorded by vertically magnetizing a magnetic film of the optical disk. An information signal vertically magnetized and recorded to the magnetic film is reproduced as follows. Namely, a linearly polarized laser beam is converged and formed as a spot on the optical disk surface and is changed to elliptically polarized light by rotating a polarizing plane leftward and rightward by a magnetic Kerr effect in accordance with the direction of a residual magnetic field. The elliptically polarized light reflected on the optical disk is separated into a p-polarized light component and an s-polarized light component. The information signal is reproduced by detecting a change in ratio of light amounts of the p and s polarized components.

A polarizing beam splitter is used to separate the reflected light into the p and s polarized light components. The polarizing plane of the reflected light and a polarizing face of the polarizing beam splitter are inclined 45° with respect to each other to accurately detect a signal even when an angle of (leftward or rightward) rotation of the reflected light according to intensity of the residual magnetic field is small. In this case, the amounts of transmitted and reflected lights with respect to the polarizing beam splitter are compared with each other.

Therefore, in a general proposal, the polarizing plane of the reflected light is rotated 45° by inserting a ½ wave plate into an optical path before light is incident to the polarizing beam splitter. Otherwise, as shown in Japanese Utility Model Application Laying Open (KOKAI) No. 1-133229, the polarizing beam splitter is rotatably disposed around the optical axis of an optical system and the polarizing surface of this polarizing beam splitter is adjusted such that this polarizing surface is inclined 45° with respect to the polarizing plane of the reflected light.

Each of a tracking control signal, a focusing control signal and a reproducing signal is formed by a difference signal. Accordingly, a C/N ratio is reduced as the amount of incident light is reduced. Therefore, there is a fear that an error signal is caused so that serious errors such as an error in operation of the optical pickup device and an error in reading of information are caused.

The polarizing beam splitter can be constructed by sticking two prisms to each other. For example, the polarizing beam splitter of a cubic type constructed by two rectangular prisms has six abrasive surfaces requiring accurate finishing. The polarizing beam splitter of a type composed of a rectangular prism and a rhombic prism has seven abrasive surfaces requiring accurate finishing. Accordingly, it is necessary to perform an adhering operation in such polarizing beam splitters so that cost of the optical pickup device is increased. The cost of the optical pickup device is further increased if an antireflection film is processed and formed on a total of three surfaces composed of an incident surface and two light emitting surfaces of the polarizing beam splitter.

Further, the amount of materials used for the prisms is large and weight of the optical pickup device is increased together with the cost thereof so that it is difficult to make the optical pickup device compact and light in weight. It is also difficult to reduce the cost and weight of the optical pickup device by disposing a ½ wave plate to incline the polarizing surface of the polarizing beam splitter by 45° with respect to the polarizing plane of light. In the proposal for removing the ½ wave plate and shown in Japanese Utility Model Application Laying Open (KOKAI) No. 1-133229, the weight of a member for supporting the prisms is increased and processing of the supporting member is complicated so that it is difficult to reduce the cost and weight of the optical pickup device.

SUMMARY OF THE INVENTION

It is therefore an object of the present invention to provide an optical pickup device in which distribution efficiency of signal light is improved to prevent an error in operation of the optical pickup device and an error in reading of information, and a polarizing beam splitter has a simplified structure for reducing cost, size and weight of the optical pickup device.

The above object of the present invention can be achieved by an optical pickup device in an optical information recording and reproducing apparatus having tracking control means for forming a beam spot on a surface of an optical information recording medium by converging a laser beam by an objective lens; the tracking control means moving the beam spot to a predetermined position of the optical information recording medium to record, reproduce and erase information; and focusing control means for maintaining a distance between the objective lens and the optical information recording medium. The optical pickup device comprises supplying means for supplying a laser beam from a laser beam source to the optical information recording medium as incident light; signal light separating means for separating all or a portion of an amount of light reflected from the optical information recording medium from the incident light and outputting this separated light as a signal light; a condenser lens for converging the signal light separated by the signal light separating means; a polarizing beam splitter constructed such that the signal light converged by the condenser lens is slantingly incident to the polarizing beam splitter; the polarizing beam splitter including an optical evaporation film having polarizing characteristics in which the signal light is separated into s and p polarized light components and the s and p polarized light components are respectively reflected on the optical evaporation film and transmitted through the optical evaporation film; tracking control signal detecting means for receiving the s-polarized light component from the polarizing beam splitter and detecting a tracking control signal; focusing control signal detecting means for receiving the p-polarized light component from the polarizing beam splitter and detecting a focusing control signal; and reproducing signal detecting means for detecting a reproducing signal in accordance with a ratio of an entire amount of light received by the tracking control signal detecting means and an entire amount of light received by the focusing control signal detecting means.

The tracking control means preferably controls a tracking operation in accordance with the tracking control signal and the focusing control means preferably controls a focusing operation in accordance with the focusing control signal.

The above object of the present invention can be also achieved by an optical pickup device for forming a beam spot on a surface of an optical information recording medium by converging a laser beam and making light reflected from the optical information recording medium incident to a polarizing beam splitter as a signal light. The optical pickup device reproduces a recorded signal by comparing an amount of light transmitted through the polarizing beam splitter with an amount of light reflected from the polarizing beam splitter with respect to the signal light.

The polarizing beam splitter is constructed by a transparent plane parallel plate including an optical evaporation film arranged on one surface thereof and having polarizing characteristics in which transmittance of a p-polarized light component and reflectivity of an s-polarized light component are respectively equal to approximately one at an incident angle set in advance.

The optical evaporation film is preferably formed on a first surface of the polarizing beam splitter onto which the signal light is incident.

The optical evaporation film is preferably formed on a first surface of the polarizing beam splitter onto which the signal light is incident, and an antireflection film is preferably formed on a second surface of the polarizing beam splitter and reflectivity of the p-polarized light component of the antireflection film is approximately equal to zero at the above incident angle.

In another structure of the optical pickup device, the polarizing beam splitter is constructed by a transparent plane parallel plate and an incident angle of the signal light is set in accordance with a refractive index of the polarizing beam splitter such that an effective signal amount provided by the polarizing beam splitter is maximum.

In another structure of the optical pickup device, the polarizing beam splitter constructed by the transparent plane parallel plate is formed in a rectangular shape and the optical pickup device has a reflecting member for reflecting the signal light from the surface of the optical information recording medium such that an optical axis of the signal light is parallel to the surface of the optical information recording medium. A first angle $\theta 1$ and a second angle $\theta 2$ are respectively set by the following first formulas in accordance with an incident angle $\theta$ of the reflected light of the reflecting member incident to the polarizing beam splitter.

$$\theta 1 = 90° - \tan^{-1}(\tan\theta/\sqrt{2})$$

$$\theta 2 = \sin^{-1}(\sin\theta/\sqrt{2})$$

The polarizing beam splitter is arranged such that one side of the rectangular polarizing beam splitter is parallel to the surface of the optical information recording medium and is inclined the first angle $\theta 1$ with respect to an optical axis of the reflected light of the reflecting member, and a parallel plane of the polarizing beam splitter is inclined the second angle $\theta 2$ with respect to a normal line of the surface of the optical information recording medium.

In the optical pickup device in the present invention, the supplying means supplies a laser beam from the laser beam source to the optical information recording medium as incident light. The signal light separating means separates all or a portion of an amount of light reflected from the optical information recording medium from the incident light and outputs this separated light as signal light. The condenser lens converges the signal light. The polarizing beam splitter makes the signal light slantingly incident thereto and separates this signal light into s and p polarized light components. The s-polarized light component is reflected from the polarizing beam splitter and the p-polarized light component is transmitted through the polarizing beam splitter.

The tracking control signal detecting means receives the s-polarized light component from the polarizing beam splitter and detects a tracking control signal. The focusing control signal detecting means receives the p-polarized light component from the polarizing beam splitter and detects a focusing control signal. The reproducing signal detecting means detects a reproducing signal in accordance with a ratio of an entire amount of light received by the tracking control signal detecting means and an entire amount of light received by the focusing control signal detecting means.

As mentioned above, the signal light is separated by the polarizing beam splitter at only one time so that distribution efficiency of the signal light is improved.

Accordingly, the amount of light received by each of the tracking control signal detecting means and the focusing control signal detecting means is increased so that a C/N ratio is improved. Further, the reproducing signal detecting means detects the reproducing signal in accordance with the ratio of the entire amounts of lights received by the respective control signal detecting means so that the C/N ratio is also improved and an error in reading of information can be prevented.

Simultaneously, the tracking control means controls a tracking operation in accordance with the tracking control signal having the improved C/N ratio. The focusing control means controls a focusing operation in accordance with the focusing control signal having the improved C/N ratio. Accordingly, an error in operation of the optical pickup device can be prevented.

Further, in the optical pickup device in the present invention, the polarizing beam splitter is constructed by a transparent plane parallel plate including an optical evaporation film arranged on one surface thereof. With respect to the optical evaporation film, transmittance of a p-polarized light component and reflectivity of an s-polarized light component are respectively equal to approximately one at an incident angle set in advance. Accordingly, the polarizing beam splitter has a simplified structure in comparison with the general polarizing beam splitter constructed by prisms stuck to each other. Further, cost of the polarizing beam splitter is very reduced and the polarizing beam splitter can be made light in weight.

The optical evaporation film is formed on the first surface of the above polarizing beam splitter. Therefore, it is possible to prevent a light amount loss caused on the first surface when the optical evaporation film is formed on the second surface of the polarizing beam splitter.

Further, an antireflection film is formed on the second surface such that reflectivity of a p-polarized light component of the antireflection film is approximately equal to zero at the above incident angle. Accordingly, the light amount loss is prevented and mixing of the p and s polarized light components is also prevented so that the C/N ratio can be improved.

Cost of the polarizing beam splitter can be further reduced by constructing the polarizing beam splitter by a transparent plane parallel plate having no optical evaporation film or no antireflection film. When such a polarizing beam splitter is used, a signal recorded to the optical information recording medium can be accurately detected if an incident angle of light is set such that an effective signal amount described later is maximized in accordance with a refractive index n of the plane parallel plate.

The polarizing beam splitter constructed by the transparent plane parallel plate may be formed in a rectangular shape including a square shape. A first angle $\theta 1$ and a second angle $\theta 2$ are respectively set by the following first formulas in accordance with an incident angle $\theta$ of reflected light of the reflecting member incident to the polarizing beam splitter.

$$\theta 1 = 90° - \tan^{-1}(\tan\theta/\sqrt{2})$$

$$\theta 2 = \sin^{-1}(\sin\theta/\sqrt{2})$$

The polarizing beam splitter is arranged such that one side of the rectangular polarizing beam splitter is parallel to the surface of the optical information recording medium and is inclined the first angle $\theta 1$ with respect to an optical axis of the reflected light of the reflecting member, and a parallel plane of the polarizing beam splitter is inclined the second angle $\theta 2$ with respect to a normal line of the surface of the optical information recording medium. Accordingly, the polarizing beam splitter can be arranged such that a polarizing surface of the polarizing beam splitter is accurately inclined 45° with respect to polarizing plane of the incident light.

Further objects and advantages of the present invention will be apparent from the following description of the preferred embodiments of the present invention as illustrated in the accompanying drawings.

BRIEF DESCRIPTION OF THE DRAWINGS

FIG. 1 is a view showing the construction of an optical pickup device in accordance with first embodiment of the present invention;

DESCRIPTION OF THE PREFERRED EMBODIMENTS

The preferred embodiments of an optical pickup device in the present invention will next be described in detail with reference to the accompanying drawings.

In magnetooptic recording and reproducing operations in which information can be erased and overwritten, the information is recorded by vertically magnetizing a magnetic film of an optical disk. An information signal vertically magnetized and recorded to the magnetic film is reproduced as follows. Namely, a linearly polarized laser beam is converged and formed as a beam spot on an optical disk surface and is changed to elliptically polarized light by rotating a polarizing plane leftward and rightward by a magnetic Kerr effect in accordance with the direction of a residual magnetic field. The elliptically polarized light reflected by the optical disk is separated into a p-polarized light component and an s-polarized light component. The information signal is reproduced by detecting a change in ratio of light amounts of the p and s polarized components.

Figure 10:
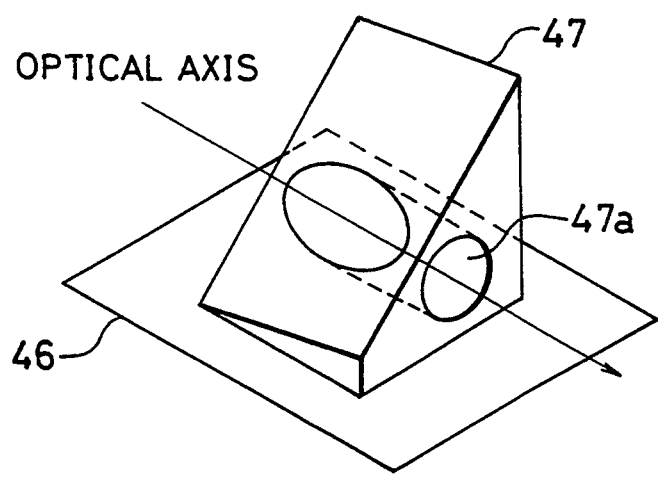
FIG. 10 is a perspective view showing one example of a holder for supporting the polarizing beam splitter shown in FIG. 9.

In a general optical pickup device, as shown in FIG. 10, a polarizing beam splitter 47 is used to separate the reflected light into the p and s polarized light components. This polarizing beam splitter is formed by adhering and sealing a polarizing coating (optical evaporation) film between slanting surfaces of two rectangular prisms. Otherwise, the polarizing beam splitter is formed by adhering and sealing the polarizing coating film between slanting surfaces of a rectangular prism and a rhombic prism as shown in Japanese Utility Model Application Laying Open (KOKAI) No. 1-133229. For example, transmittance of a p-polarized light component and reflectivity of an s-polarized light component of the polarizing coating film are respectively set to approximately one when an incident angle of light is set to 45°.

Figure 13:
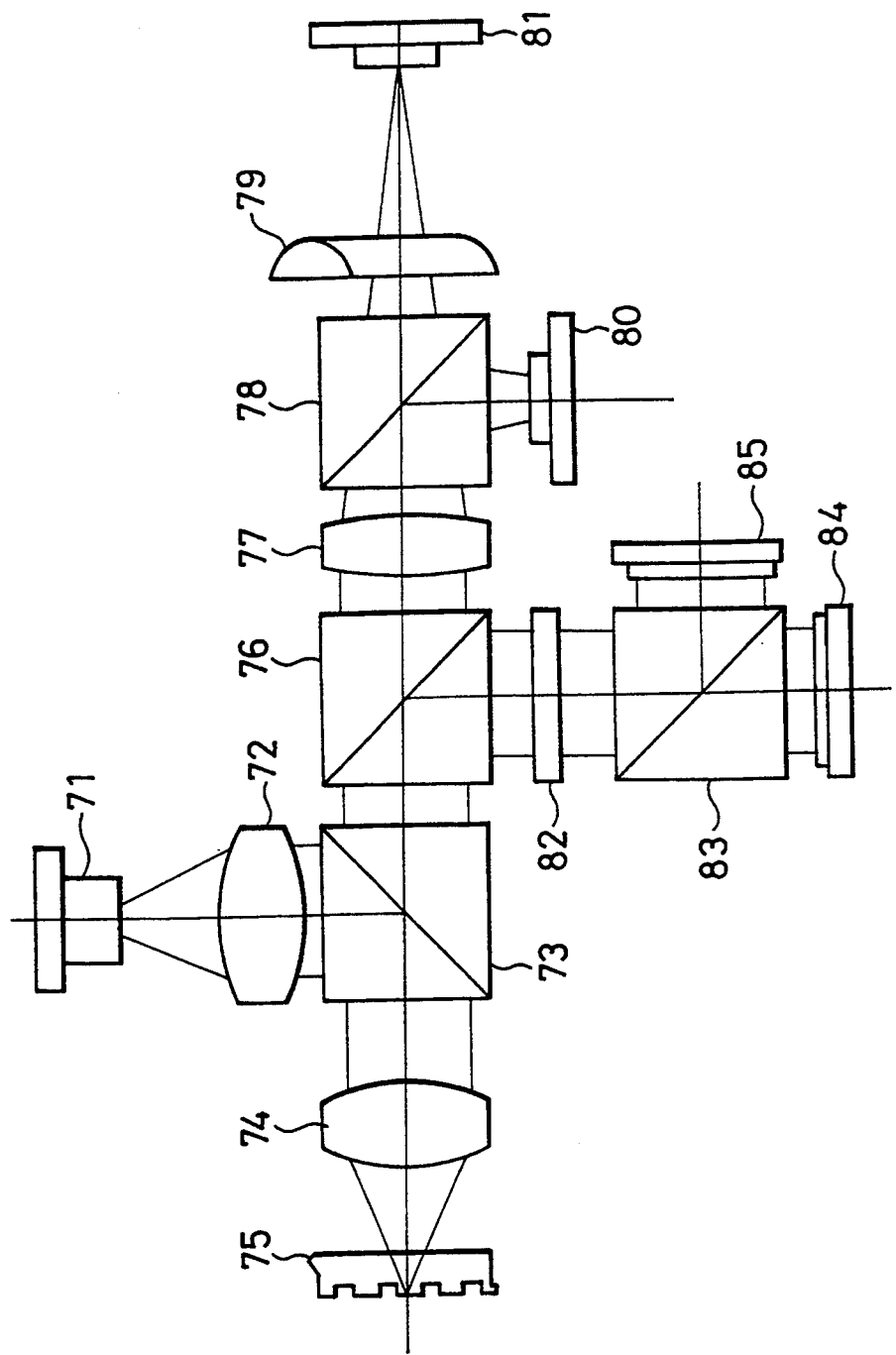
FIG. 13 is a view showing the construction of an optical pickup device as a general example.

FIG. 13 shows an example of the general optical pickup device using an astigmatic method when a focusing control signal is detected. In the general example shown in FIG. 13, a laser beam is emitted from a laser diode 71 and is focused and formed as a beam spot on an optical disk 75 through a coupling lens 72, a polarizing beam splitter 73 and an objective lens 74.

Light reflected by the optical disk 75 is again incident through the objective lens 74 to the polarizing beam splitter 73. All or a portion of an amount of this light is transmitted by the polarizing beam splitter 73 to a detecting section as signal light. The detecting section is divided into a control signal detecting section and a reproducing signal detecting section by the beam splitter 76 with respect to the signal light.

In the control signal detecting section, the signal light is converged by a condenser lens 77 and is again divided by a half mirror prism 78. A portion of the signal light reflected by the half mirror prism 78 is incident to a tracking photodiode 80 for detecting a tracking control signal, thereby detecting the tracking control signal. In the following description, the photodiode is called PD.

Astigmatism is caused by a cylindrical lens 79 with respect to another portion of the signal light transmitted through the half mirror prism 78. This light portion is incident to a focusing photodiode 81 to detect a focusing control signal.

In the reproducing signal detecting section, a polarizing direction of the signal light divided by the beam splitter 76 is approximately rotated 45° by a ½ wave plate 82. Thereafter, this signal light is incident to a polarizing beam splitter 83. The signal light is separated into a p-polarized light component and an s-polarized light component by the polarizing beam splitter 83. The p and s polarized light components are respectively incident to reproducing signal detecting photodiodes 84 and 85 in a state in which amounts of the p and s polarized light components are approximately equal to each other. When deflection is caused at a certain angle with respect to a polarizing plane of the reflected light by a change in recorded information, a ratio of the p and s polarized light components is changed so that a reproducing signal can be detected.

However, in the general example shown in FIG. 13, the signal light as light reflected by the optical disk 75 is divided many times by the polarizing beam splitter 73, the beam splitter 76, the half mirror prism 78 and the polarizing beam splitter 83. Therefore, there is a problem that the amounts of lights respectively incident to the photodiodes 80, 81, 84 and 85 are small.

Further, each of the tracking photodiode 80 and the focusing photodiode 81 is constructed by divisional light-receiving elements having a plurality of divided light-receiving surfaces. Accordingly, the amount of light incident to each of the light-receiving elements is further reduced. Each of the reproducing signal detecting photodiodes 84 and 85 is constructed by a single light-receiving element. However, a difference (or ratio) between detecting signals of the reproducing signal detecting photodiodes 84 and 85 is small since a change in angle of rotation of light caused by a signal recorded to the optical disk 75 is small.

FIG. 1 is a view showing the construction of an optical pickup device in accordance with a first embodiment of the present invention.

The optical pickup device 50 shown in FIG. 1 is constructed by a light source section 51 as a light supplying means, a tracing section 55 composed of an objective lens 56, a polarizing beam splitter 58 as a signal light separating means, a condenser lens 60 and a ½ wave plate 61. The optical pickup device 50 is also constructed by a polarizing beam splitter 63 having an optical evaporation film on a first surface thereof, and a tracking photodiode 65 as a means for detecting a tracking control signal. The optical pickup device 50 is further constructed by a focusing photodiode 66 as a means for detecting a focusing control signal, and a reproducing signal detector 67 as a means for detecting a reproducing signal.

The light source section 51 is composed of a laser diode 52 as a laser beam source and a coupling lens 53. A laser beam is outputted from the laser diode 52 as a divergent light beam and is changed to a parallel light beam by the coupling lens 53. This parallel light beam is then incident to the polarizing beam splitter 58. A portion of this parallel light beam is transmitted through the polarizing beam splitter 58. Another portion of the parallel light beam is reflected by the polarizing beam splitter 58 and is transmitted in a leftward direction. The light beam in the leftward direction is focused and formed as a beam spot on the recording surface of an optical disk 6 by the objective lens 56 of the tracing section 55.

The recording surface of the optical disk 6 is really parallel to a paper surface of FIG. 1 and the tracing section 55 is integrally constructed by an unillustrated reflecting member and the objective lens 56 and is moved along the optical axis of a lens system by tracking control in leftward and rightward directions as described later in an optical pickup device in accordance with a second embodiment of the present invention. However, such a structure is omitted in FIG. 1. After the optical axis is raised by the reflecting member, light is focused and formed as a beam spot by the objective lens 56 slightly moved by focusing control in a vertical direction (in the leftward and rightward directions in FIG. 1).

Light reflected by the optical disk 6 is modulated by slightly rotating a polarizing plane thereof in accordance with information recorded to the optical disk 6. The reflected light as signal light is again changed to a parallel light beam by the objective lens 56 and is reversely transmitted along the optical axis. This signal light is transmitted through the polarizing beam splitter 58 and is partially reflected by this polarizing beam splitter 58. The transmitted light is incident to the condenser lens 60.

Similar to the general example and the second embodiment described later, the polarizing beam splitter is used in the first embodiment to separate the signal light from the incident light from the light source section. The reasons for use of the polarizing beam splitter will be explained later in summary.

The signal light as a parallel light beam is changed to a convergent tight beam by the condenser lens 60. A polarizing plane of the signal light is rotated 45° when this signal light is transmitted through the ½ wave plate 61. The signal light is incident to the polarizing beam splitter 63 in a state in which the polarizing plane is inclined 45° with respect to a paper surface of FIG. 1 and is slantingly inclined with respect to a normal line of the polarizing beam splitter 63. Namely, the signal light is incident to the polarizing beam splitter 63 at an incident angle $\theta$ set in advance with respect to the normal line. Accordingly, the amount of an s-polarized light component separated and reflected by the polarizing beam splitter 63 is approximately equal to the amount of a p-polarized light component transmitted through the polarizing beam splitter 53.

In this case, the polarizing beam splitter 63 is slantingly arranged such that the normal line of the polarizing beam splitter 63 is set to the incident angle $\theta$ set in advance with respect to the optical axis of the signal light. A polarizing coating film as an optical evaporation film is formed on a first surface of the polarizing beam splitter 63. This polarizing coating film has polarizing characteristics in which each of reflectivity of the s-polarized light component and transmittance of the p-polarized light component of the signal light is approximately equal to one when the signal light is incident to the polarizing beam splitter at the incident angle $\theta$.

The tracking photodiode 65 receives the s-polarized light component reflected by the polarizing beam splitter 63. The tracking photodiode 65 is disposed in a position separated from (but closer to) the position of a focal point of the condenser lens 60 on an optical axis of the s-polarized light component. The tracking photodiode 65 is constructed by two divisional light-receiving elements divided leftward and rightward at an intersecting point of this optical axis and the tracking photodiode 65.

When a beam spot formed on the optical disk 6 is shifted from the center of a track having recorded information in a radial direction of the optical disk 6, the amounts of lights incident to the leftward and rightward light-receiving elements of the tracking photodiode 65 are unbalanced in accordance with a shifting amount and a shifting direction of the beam spot.

Accordingly, the tracking photodiode 65 outputs a tracking control signal by calculating a difference signal between output signals of the leftward and rightward light-receiving elements. The tracking photodiode 65 also calculates a sum signal of the output signals of the leftward and rightward light-receiving elements. The tracking photodiode 65 outputs this sum signal to the reproducing signal detector 67 as a signal according to an entire light amount of the s-polarized light component.

The p-polarized light component transmitted through the polarizing beam splitter 63 is changed to a convergent light beam by the condenser lens 60. Accordingly, this p-polarized light beam is generally similar to a divergent or convergent light beam transmitted through a transparent plane parallel plate so that astigmatism is caused with respect to the p-polarized light beam. Therefore, it is not necessary to dispose the cylindrical lens 79 shown in FIG. 13 in the general example so that cost of the optical pickup device is reduced and the loss of a light amount is reduced in comparison with the general example.

The focusing photodiode 66 for receiving the p-polarized light component is disposed in a focal point position of the condenser lens 60 on an optical axis of the p-polarized light component. This focal point position is the position of a least circle of confusion of a light beam causing astigmatism. The focusing photodiode 66 is constructed by four divisional light-receiving elements divided upwards, downwards, leftward and rightward on divisional lines perpendicular to each other. The four divisional light-receiving elements are respectively inclined 45° with respect to a paper surface of FIG. 1 around an intersecting point of the optical axis and the focusing photodiode 66 as a center.

An image of the p-polarized light component formed at a divisional centaur of the focusing photodiode 66 is formed as a circle or an ellipse extended longitudinally or transversally by astigmatism. Such a circle or an ellipse extended longitudinally or transversally is formed as the objective lens 56 is located in a position for correctly forming a beam spot on a recording surface of the optical disk 6, or is moved toward or away from the optical disk 6.

Accordingly, the focusing photodiode 66 calculates a difference signal between a sum signal (as a longitudinal signal) of output signals of the upward and downward light-receiving elements as a pair and a sum signal (as a transversal signal) of output signals of the leftward and rightward light-receiving elements as a pair. The focusing photodiode 66 then outputs a focusing control signal by this calculation of the difference signal. The focusing photodiode 66 also calculates and outputs a sum signal of the longitudinal and transversal signals to the reproducing signal detector 67 as a signal according to an entire light amount of the p-polarized light component.

The reproducing signal detector 67 compares the above signals according to the entire light amounts of the s-polarized light component and the p-polarized light component respectively inputted to the reproducing signal detector 67 from the tracking photodiode 65 and the focusing photodiode 66. The reproducing signal detector 67 then judges by comparing these signals with each other whether information recorded to the optical disk 6 shows value "1" or "0". The reproducing signal detector 66 outputs a reproducing signal from this judgment.

A polarizing plane of the signal light is inclined 45° (in a positive or negative rotational direction) with respect to a polarizing surface of the polarizing beam splitter 63. Accordingly, the amounts of the p and s polarized light components are equal to each other if there is no magnetic field at an irradiating point of the beam spot on the optical disk 6. In contrast to this, when there is a magnetic field at this irradiating point, for example, the amount of the p-polarized light component is increased and the amount of the s-polarized light component is reduced so that p>s is formed. If a direction of the magnetic field is opposite, p<s is formed. Accordingly, it is possible to detect a signal in accordance with a positive or negative value shown by a difference signal according to the respective entire light amounts of the s and p polarized light components.

Figure 2A:
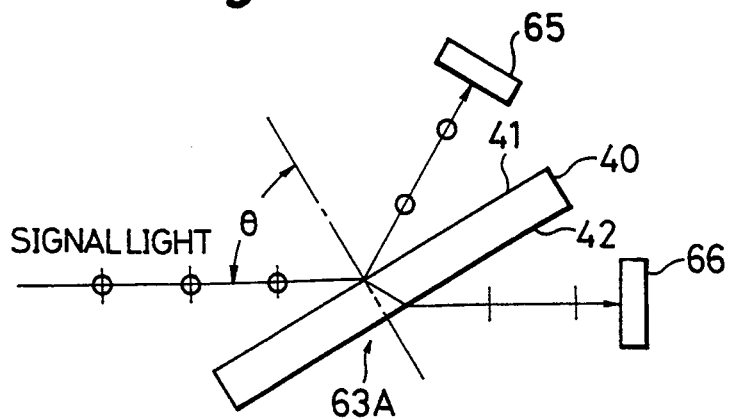
FIGS. 2a and 2b are cross-sectional views showing the construction of a polarizing beam splitter as a first embodiment used in the present invention, and polarized light components separated by using this polarizing beam splitter.
Figure 2B:
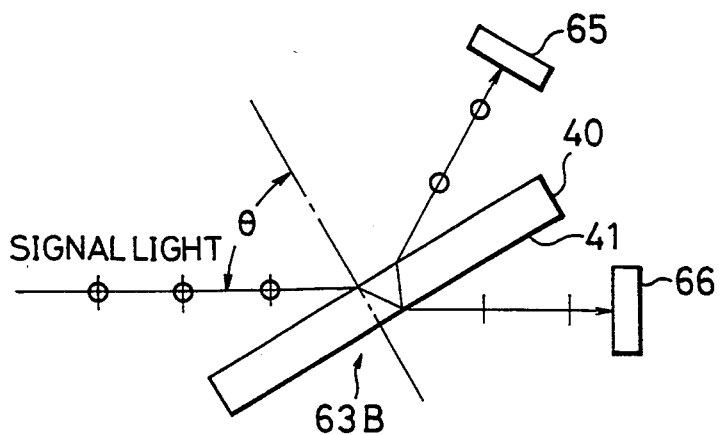

FIGS. 2a and 2b are cross-sectional views showing the construction of the polarizing beam splitter 63 in the first embodiment of the present invention and polarized light components separated by using this polarizing beam splitter. FIGS. 2a and 2b omit hatching showing a cross section. In FIG. 2a, a polarizing coating film 41 as an optical evaporation film is formed on a first surface of a glass plate 40 constructed by a transparent plane parallel plate. Each of transmittance of a p-polarized light component and reflectivity of an s-polarized light component of the polarizing coating film 41 is approximately set to one at an incident angle $\theta$ set in advance. An antireflection film 42 is formed on a second surface of the glass plate 40. Reflectivity of the p-polarized light component of the antireflection film 42 is approximately equal to zero at this incident angle $\theta$. FIG. 2a shows a polarizing beam splitter 63A having the polarizing coating film 41 and the antireflection film 42. FIG. 2b shows a polarizing beam splitter 63B having a polarizing coating film 41 formed on the second surface of the glass plate 40.

Elliptically polarized signal light near linearly polarized light is incident to each of the polarizing beam splitters 63A and 63B from the left-hand side in FIGS. 2a and 2b. A polarizing plane of the signal light is inclined 45° with respect to a polarizing surface of each of the polarizing beam splitters 63A and 63B. Accordingly, the signal light is incident to each of the polarizing beam splitters in a state in which the light amounts of p and s polarized light components of the signal light are approximately equal to each other through the polarizing beam splitters 63A and 63B. With respect to this incident signal light, one of the light amounts of the p and s polarized light components is slightly larger than another in accordance with the direction of a magnetic field.

Since the polarizing coating film 41 is formed on the first surface of the polarizing beam splitter 63A shown in FIG. 2a, the s-polarized light component is almost reflected on the polarizing coating film 41 and is received by the tracking photodiode 65. In contrast to this, the p-polarized light component is almost transmitted through the polarizing coating film 41 and the antireflection film 42 and is received by the focusing photodiode 66.

Since the polarizing coating film 41 is formed on the second surface of the polarizing beam splitter 63B shown in FIG. 2b, the incident signal light is slightly reflected by a first surface of the polarizing beam splitter 63B, but almost reaches the second surface of the polarizing beam splitter 63B. Similar to the polarizing beam splitter 63A, the s-polarized light component is almost reflected by the polarizing coating film 41 and the p-polarized light component is almost transmitted through the polarizing coating film 41.

However, the incident signal light is reflected by the first surface of the polarizing beam splitter 63B. As explained later with reference to FIG. 4, an amount of the p-polarized light component is smaller than that of the s-polarized light component, but is slightly transmitted to the tracking photodiode 65. Further, transmittance of the p-polarized light component and reflectivity of the s-polarized light component of the polarizing coating film 41 can be set to be very close to one in both the cases of the polarizing beam splitters 63A and 63B. However, the transmittance of the p-polarized light component and the reflectivity of the s-polarized light component of the polarizing coating film 41 cannot be set to one so that reflectivity of the p-polarized light component and transmittance of the s-polarized light component cannot be set to zero.

Accordingly, an s-polarized light component and a p-polarized light component are respectively mixed and included slightly in transmitted light of the p-polarized component and reflected light of the s-polarized component by the polarizing beam splitters 63A and 63B. Amounts of these mixed light components are added to the amounts of lights incident to the tracking photodiode 65 and the focusing photodiode 66. However, the amounts of these mixed light components are subtracted from effective signal amounts for detecting signals. Accordingly, it is preferable to reduce the amounts of the mixed light components.

Accordingly, the polarizing beam splitter 63A having the polarizing coating film 41 on the first surface thereof is excellent in comparison with the polarizing beam splitter 63B having the polarizing coating film 41 on the second surface thereof even when no antireflection film 42 is formed on the second surface of the polarizing beam splitter 63A. If the antireflection film 42 is formed on the second surface of the polarizing beam splitter 63A and approximately has zero reflectivity of the p-polarized light component, an effective light amount of the p-polarized light component transmitted through this antireflection film 42 is increased so that a mixed light amount of the p-polarized light component reflected on this antireflection film 42 is reduced.

If reflectivity of the s-polarized light component of the antireflection film 42 is increased, a mixed light amount of the s-polarized light component is reduced with respect to the effective light amount of the transmitted p-polarized light component. Accordingly, the light amount of a mixed light component in the polarizing beam splitter 63A is reduced in comparison with that in the polarizing beam splitter 63B so that the effective light amount in the polarizing beam splitter 63A is increased.

Figure 3:
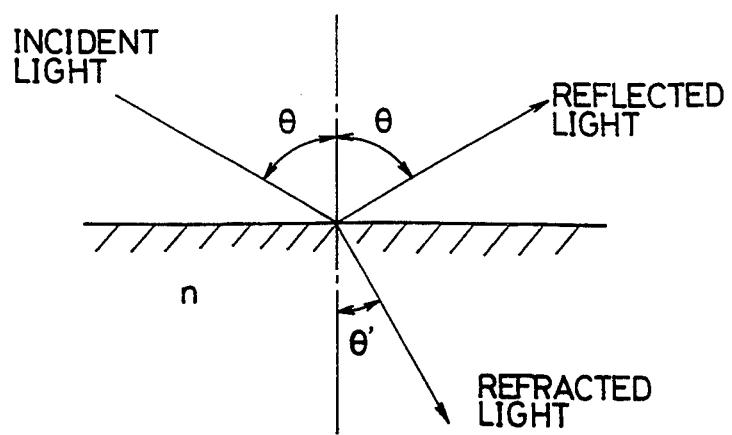
FIG. 3 is an explanatory view showing the relation between an incident angle of light and an angle of refraction of this light on a glass surface.

FIG. 3 is an explanatory view showing the relation between an incident angle $\theta$ of light incident onto a surface of glass having a refractive index n and an angle $\theta'$ of refraction of this light.

In general, when light is incident to a surface of glass having a refractive index n at an incident angle $\theta=0$, i.e., in a perpendicular direction, reflectivity R and transmittance T of this light are provided by the following second formulas.

$R = (n-1)^2/(n+1)^2$ $T = 1 - R$

For example, if refractive index n is equal to 1.5, reflectivity R is equal to 4% irrespective of polarized light components so that transmittance T is equal to 96%.

However, as shown in FIG. 3, when light is slantingly incident to the glass surface at the incident angle $\theta > 0$, reflectivities Rp, Rs and transmittances Tp, Ts with respect to p and s polarized light components are respectively different from each other.

In FIG. 3, the angle $\theta'$ of refraction is calculated from the incident angle $\theta$ by the following third formula.

$$\theta' = \sin^{-1}(\sin\theta/n)$$

At this time, reflectivities Rp, Rs and transmittances Tp, Ts are calculated by the following fourth formulas.

$$Rp = \tan^2(\theta-\theta')/\tan^2(\theta+\theta')$$

$$Rs = \sin^2(\theta-\theta')/\sin^2(\theta+\theta')$$

$$Tp = 1 - Rp$$

$$Ts = 1 - Rs$$

Figure 4:
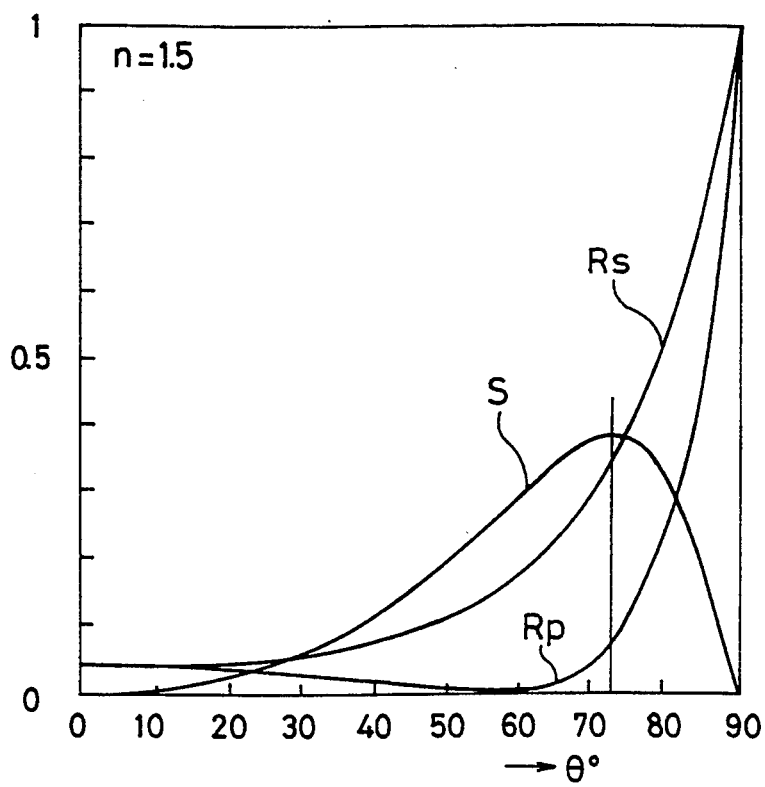
FIG. 4 is a graph showing the reflectivities of p and s polarized light components with respect to the incident angle and one example of a change in effective signal amount.

FIG. 4 is a graph showing reflectivities Rp, Rs of the p and s polarized light components with respect to the incident angle $\theta = 0°$ to $90°$ in the case of refractive index $n = 1.5$ and a change in effective signal amount S defined later. In FIG. 4, transmittances Tp and Ts of the p and s polarized light components are omitted.

As can be seen from FIG. 4, the reflectivity Rs of the s-polarized light component is equal to 0.04 when $\theta = 0$ and is gradually increased when $\theta$ is small. The reflectivity Rs of the s-polarized light component is rapidly increased when $\theta$ is increased. The reflectivity is of the s-polarized light component is increased until $\theta = 90°$ and is equal to one when $\theta = 90°$. In contrast to this, the reflectivity Rp of the p-polarized light component is gradually decreased from 0.04 and is equal to zero when $(\theta + \theta') = 90°$, i.e., when $\tan(\theta+\theta') = \infty$. Thereafter, the reflectivity Rp of the p-polarized light component is rapidly increased and is equal to one when $\theta = 90°$.

Figure 5:
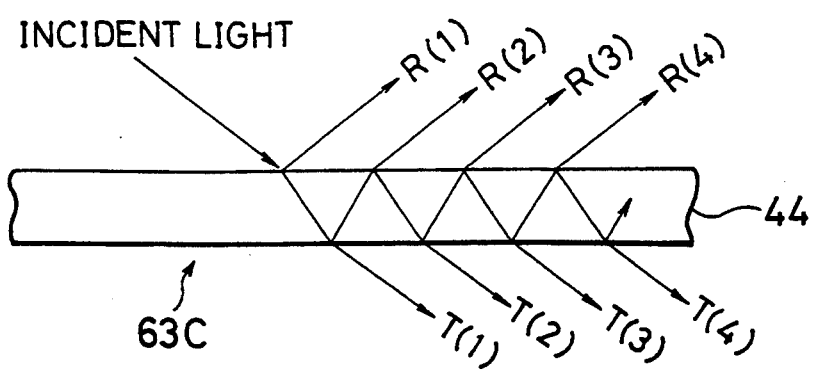
FIG. 5 is a cross-sectional view showing the construction of a polarizing beam splitter as a second embodiment used in the present invention, and transmitted and reflected lights provided by multiple reflection.

FIG. 5 is a cross-sectional view showing the construction of a polarizing beam splitter 63 as a second embodiment thereof and transmitted and reflected lights by multiple reflection. Similar to FIG. 2, hatching is omitted in FIG. 5.

A polarizing beam splitter 63C shown in FIG. 5 is constructed by a glass plate 44 having a refractive index n and composed of a transparent plane parallel plate having no polarizing coating film and no antireflection film.

The above second, third and fourth formulas relate to explanations about the first surface of the polarizing beam splitter 63C. $\theta$ is an incident angle of light in the air and $\theta'$ is an angle of refraction of this light in glass. Therefore, as is well-known, reflectivities Rp and Rs with respect to the second surface of the polarizing beam splitter respectively have the same values as the first surface. Accordingly, as is well-known, transmittances Tp and Ts with respect to the second surface also have respectively the same values as the first surface.

Therefore, as shown in FIG. 5, light once incident to glass is reflected multiple times (theoretically infinite times) on the first and second surfaces of the polarizing beam splitter 63C. In each of the multiple reflections, a slight amount of light is omitted into the air on each of the first and second surfaces. If this slight amount of light is emitted into the air on the first surface, this light is added to light reflected on the polarizing beam splitter 63C. In contrast to this, if this slight amount of light is omitted into the air on the second surface, this light is added to light transmitted through the polarizing beam splitter 63C.

An entire amount PT of the transmitted light and an entire amount PR of the reflected light are calculated by the following fifth and sixth formulas in consideration of the amount of light emitted into the air by the multiple reflection.

$$\begin{aligned}PT &= \sum_{k=1}^{\infty} T(k) \\ &= T^2 + T^2R^2 + T^2R^4 + \ldots + T^2R^{2k-2} + \ldots \\ &= T^2 \sum_{k=1}^{\infty} R^{2k-2} \\ &= T^2/(1-R^2) = T/(1+R) \\ &= (1-R)/(1+R)\end{aligned}$$

$$\begin{aligned}PR &= \sum_{k=1}^{\infty} R(k) \\ &= R + T^2R + T^2R^3 + \ldots + T^2R^{2k-3} + \ldots \\ &= R\left(1 + T^2 \sum_{k=2}^{\infty} R^{2k-4}\right) \\ &= R\{1 + T^2/(1-R^2)\} = R\{1 + T/(1+R)\} \\ &= R\{1 + (1-R)/(1+R)\}\end{aligned}$$

In these fifth and sixth formulas, the entire light amounts PT and PR are respectively provided as a sum of transmitted lights T(k) and a sum of reflected lights R(k) sequentially calculated from reflectivity R and transmittance $T = 1 - R$ on each of the first and second surfaces when an amount of incident light is set to one. In the fifth and sixth formulas, reference numeral k designates an integer equal to or greater than one.

In the following description, reference numerals Pip and Pis respectively designate light amounts of p and s polarized components of signal light incident to the polarizing beam splitter 63C. Each of Rp and Rs is substituted for R in the above fifth and sixth formulas. In this case, PTp, PRp and PTs, PRs as p and s polarized light components about the entire amounts PT and PR of transmitted and reflected lights are respectively provided by the following seventh formulas.

$$PTp = Pip(1-Rp)/(1+Rp)$$

$$PRp = Pip\, Rp\{1+(1-Rp)/(1+Rp)\}$$

$$PTs = Pis(1-Rs)/(1+Rs)$$

$$PRs = Pip\, Rs\{1+(1-Rs)/(1+Rs)\}$$

In the four light amount signals shown in the above seventh formulas, effective signals in signal detection are PTp and PRs and the other signals PTs and PRp are noise signals for respectively canceling the effective signals PTp and PRs. Accordingly, Pip = Pis (=0.5) is formed when a signal on the optical disk 6 is in a neutral state (in which there is no magnetic field) and no signal light reflected on the optical disk 6 is rotated by a Kerr effect. Pip is approximately equal to Pis even when the signal light is rotated by the magnetic field. Therefore, an effective signal amount S is defined by the following eighth formula.

$$\begin{aligned}S &= \{(PTp - PTs) + (PRs - PRp)\}/2 \\ &= \{(PTp + PRs) - (PTs + PRp)\}/2\end{aligned}$$

FIG. 4 shows a curve S provided by plotting calculated values of the effective signal amount S at $\theta=0°$ to 90° when refractive index n of the glass plate 44 in the polarizing beam splitter 63C is set to 1.5 and the effective signal amount S is set to a function $S(\theta)$ with the incident angle $\theta$ as a variable. As can be seen from FIG. 4, the effective signal amount S is equal to zero when $\theta=0°$. The effective signal amount S is increased as the incident angle $\theta$ is increased. The effective signal amount S reaches a maximum value 0.39 when $\theta$ is approximately equal to 72°. Thereafter, the effective signal amount S is gradually decreased and is again returned to zero when $\theta=90°$.

Similarly, a maximum value Smax of the effective signal amount S and an incident angle $\theta$ at this time are changed in accordance with the refractive index of the glass plate 44. However, the incident angle $\theta$ providing the maximum effective signal amount exists at any time. Accordingly, if the incident angle $\theta$ is set to a value providing the maximum effective signal amount, a signal can be most effectively detected. The following Table 1 shows values of Smax and the incident angle $\theta$ at this value Smax when the refractive index n is changed in 0.2 steps from 1.5 to 1.9.

TABLE 1

| n | S max | $\theta$ |
|---|---|---|
| 1.5 | 0.385 | 72.4° |
| 1.7 | 0.486 | 71.9° |
| 1.9 | 0.566 | 71.9° |

As can be seen from the Table 1, Smax is increased as the refractive index n is increased.

In the polarizing beam splitter 63C in this second embodiment, the effective signal amount S is low in comparison with that in each of the polarizing beam splitters 63A and 63B in the first embodiment. However, a signal can be accurately detected in the case of the polarizing beam splitter 63C and can be further accurately detected by using the glass plate 44 made of a material having a high refractive index n. In the second embodiment, there is no antireflection film 42 and no polarizing coating film 41 increasing cost of the polarizing beam splitter so that cost of the polarizing beam splitter can be very reduced.

In general, a substrate for arranging respective constructional members of the optical pickup device is parallel to a surface of the optical disk in many cases when a polarizing face of the polarizing beam splitter composed of a transparent plane parallel plate is inclined 45° with respect to a polarizing plane of signal light. Further, in this case, the polarizing plane of a laser beam irradiated to the optical disk and the polarizing plane of signal light reflected on this optical disk are perpendicular or parallel to the substrate in many cases. Therefore, it is necessary to incline the polarizing surface of the polarizing beam splitter 45° with respect to the substrate.

Figure 6:
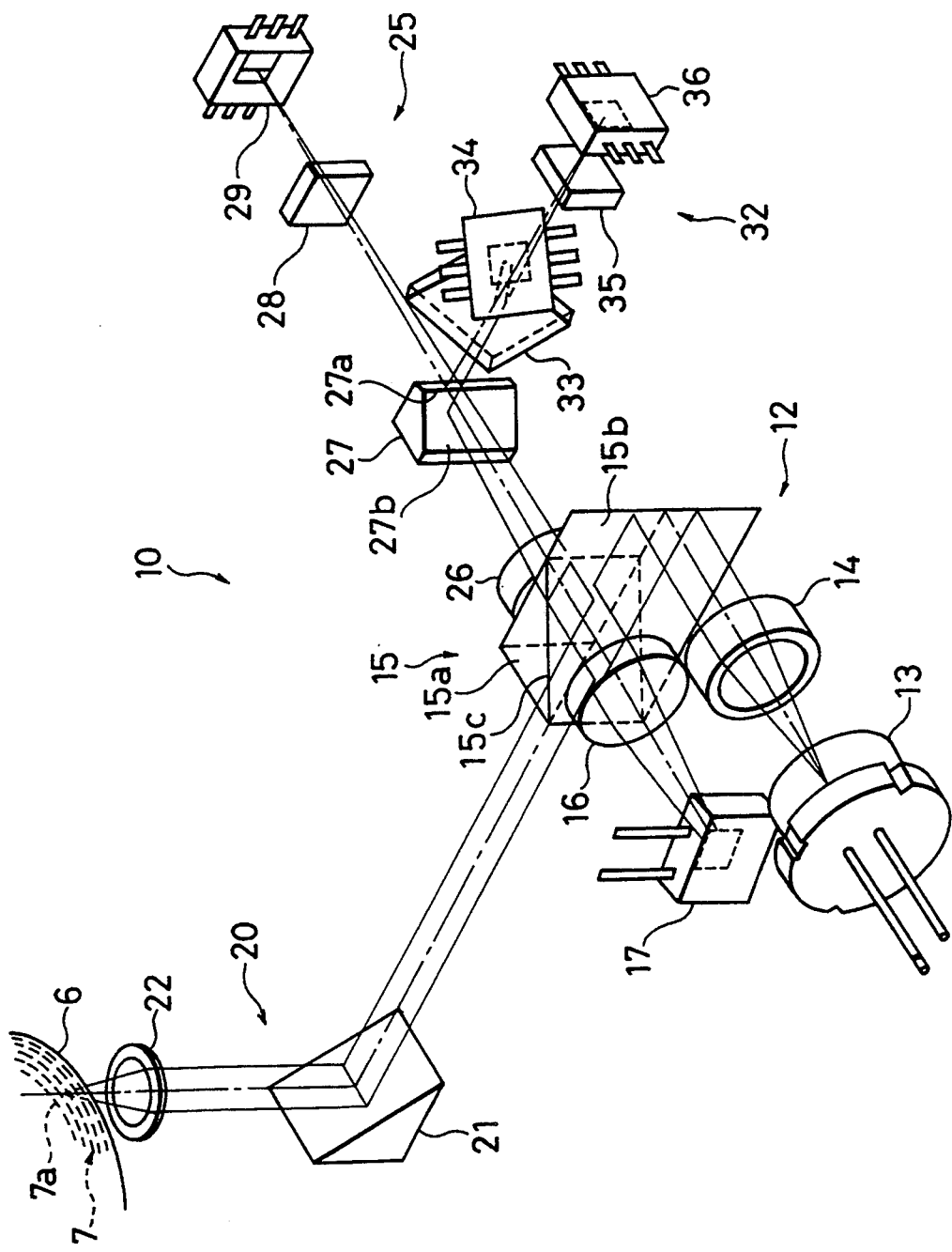
FIG. 6 is a perspective view showing a main portion of an optical pickup device using the polarizing beam splitter having a polarizing face inclined 45° in accordance with a second embodiment of the present invention.

FIG. 6 is a perspective view showing a main portion of an optical pickup device using a polarizing beam splitter 33 in accordance with a second embodiment of the present invention in which a polarizing surface of the polarizing beam splitter is inclined 45° with respect to a substrate.

This optical pickup device 10 is constructed by a light source section 12 composed of a laser diode 13, a coupling lens 14, a polarizing beam splitter 15, a monitor lens 16 and a monitor photodiode 17. The optical pickup device 10 is also constructed by a tracing section 20 composed of a prism mirror 21 and an objective lens 22. The optical pickup device 10 is also constructed by a focusing error detecting section 25 composed of a condenser lens 26, a knife edge prism 27, a focusing adjuster 28 and a focusing photodiode 29. The optical pickup device 10 is further constructed by a signal detecting section 32 composed of a polarizing beam splitter 33, a reproducing signal detecting photodiode 34, a tracking adjuster 35 and a tracking photodiode 36. The signal detecting section 32 also functions as a tracking error detecting section. The above constructional elements are arranged on a plane parallel to a surface of an optical disk 6 except for the objective lens 22 and the reproducing signal detecting photodiode 34 as a means for detecting a reproducing signal.

A linearly polarized laser beam is emitted as a divergent light beam from the laser diode 13 of the light source section 12. This linearly polarized laser beam is changed to a parallel light beam by the coupling lens 14 and is incident to the polarizing beam splitter 15. The polarizing beam splitter 15 is constructed by a rectangular prism 15a and a trapezoidal prism 15b stuck to each other. A polarizing coating 15c is formed on sticking surfaces of the rectangular prism 15a and the trapezoidal prism 15b. The parallel light beam incident to the polarizing beam splitter 15 is reflected on a slanting surface of the trapezoidal prism 15b in a perpendicular direction and is then divided into two light portions by the polarizing coating 15c.

This reflected light is converged by the monitor lens 16 onto a light-receiving surface of the monitor photodiode 17. An output of the monitor photodiode 17 is then fed back to a driving electric current of the laser diode 13 to servo-control an operation of the optical pickup device such that a laser output is constant. In contrast to this, light transmitted through the polarizing beam splitter 15 is transmitted as a parallel light beam to the tracing section 20 as it is.

The tracing section 20 is moved along an optical axis of the parallel light beam in a radial direction of the optical disk 6 in accordance with the position of a signal track 7a to be detected in a signal track group 7 recorded on a lower surface of the optical disk 6. The parallel light beam incident to the tracing section 20 and reflected on the prism mirror 21 is changed by the tracing section 20 to a light beam in a direction perpendicular to the optical disk 6. Thereafter, a spot is formed by the objective lens 22 on the signal track 7a to be detected.

A polarizing plane of reflected light of the beam spot as signal light from the signal track is rotated leftward or rightward in accordance with the direction of a magnetic field recorded to the signal track 7a. The direction of the magnetic field is set to a vertical direction in FIG. 6. This signal light is changed to a parallel light beam by the objective lens 22 and is reflected on the prism mirror 21 in a perpendicular direction. The reflected light is thus changed to a light beam parallel to the optical disk 6 and is reversely transmitted to the polarizing beam splitter 15 along the same optical path as the incident light beam. The signal light incident to the polarizing beam splitter 15 is again reflected on the polarizing coating 15c and is incident to the focusing error detecting section 25.

The signal light incident to the focusing error detecting section 25 is focused and formed by the condenser lens 26 as an image of convergent light on the focusing photodiode 29. This convergent light is divided into two light beams by the knife edge prism 27 having a knife edge 27a arranged on the optical axis of a lens system immediately after the condenser lens 26. A right-hand half light beam transmitted on a right-hand side of the knife edge prism 27 is transmitted toward the focusing photodiode 29 as it is. A left-hand half light beam transmitted on a left-hand side of the knife edge prism 27 is reflected on a mirror surface 27b of the knife edge prism 27 and is incident to the signal detecting section 32.

The right-hand half light beam of the signal light transmitted toward the focusing photodiode 29 is transmitted through the focusing adjuster 28 composed of a transparent plane parallel plate and arranged in a direction approximately perpendicular to an optical axis of this right-hand light beam. The right-hand half light beam is then formed as an image on the focusing photodiode 29 having two divisional light-receiving elements divided in a longitudinal direction. The focusing adjuster 28 accurately forms an image on a divisional line of the focusing photodiode 29 by adjusting an inclination of the focusing adjuster 28.

It is detected by a difference signal between outputs of the respective divisional light-receiving elements of the focusing photodiode 29 whether the beam spot on the optical disk 6 is correctly formed as an image, or a position of this beam spot is shifted in a far or near direction. In a knife edge method, a position of the objective lens 22 is servo-controlled by this detection. This knife edge method is well known. Therefore, a detailed explanation about this knife edge method is omitted in the following description.

The left-hand half light beam of the signal light reflected on the mirror surface 27b of the knife edge prism 27 is incident to the signal detecting section 32 and is elliptically polarized. A p-polarized component of this left-hand half light beam is transmitted through the polarizing beam splitter 33 having a polarizing surface inclined 45° with respect to a polarizing plane of this light beam. The p-polarized component is further transmitted through the tracking adjuster 35 and is formed as an image on the tracking photodiode 36 having two divisional light-receiving elements. An s-polarized component of the left-hand half light beam is reflected on the polarizing beam splitter 33 and is incident to the reproducing signal detecting photodiode 34.

It is detected by a difference signal between outputs of the two divisional light-receiving elements of the tracking photodiode 36 whether a beam spot correctly traces the signal track 7a, or a position of the beam spot is shifted in a leftward or rightward direction. In a push-pull method, a position of the tracing section 20 is servo-controlled by this detection. This push-pull method is also well known. Therefore, a detailed explanation about this push-pull method is omitted in the following description. An operation of the tracking adjuster 35 is similar to that of the focusing adjuster 28.

A sum signal of the two outputs of the tracking photodiode 36 corresponds to the light amount of a p-polarized component of signal light provided by the polarizing beam splitter 33. An output of the reproducing signal detecting photodiode 34 corresponds to the light amount of an s-polarized component of the signal light. The polarizing plane of the signal light is inclined 45° with respect to the polarizing surface of the polarizing beam splitter 33. Accordingly, the light amounts of the p and s polarized components are equal to each other if there is no magnetic field at an irradiating point of the beam spot with respect to the signal track 7a.

If the magnetic field is nonzero, for example, the light amount of the p-polarized light component is increased and the light amount of the s-polarized light component is decreased so that p>s is formed. If a direction of the magnetic field is opposite, p<s is formed. Accordingly, a reproducing signal can be detected in accordance with a positive or negative value shown by a difference signal between outputs of the reproducing signal detecting photodiode 34 and the tracking photodiode 36.

Figure 9A:
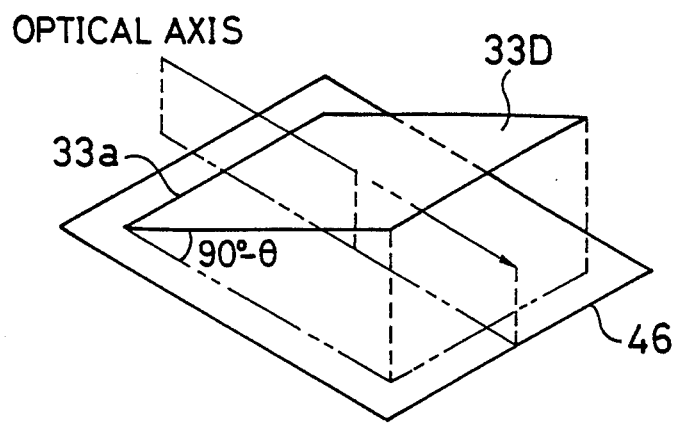
FIGS. 9a and 9b are perspective views for explaining one example of the arrangement of a polarizing beam splitter in a general method.
Figure 9B:
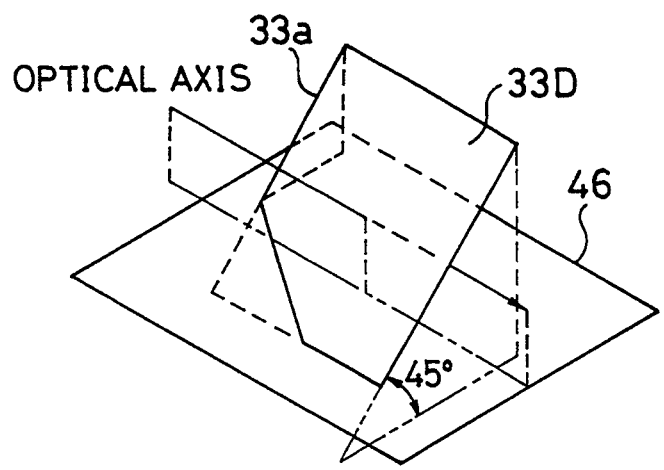

FIGS. 9a and 9b are perspective views for explaining the arrangement of a polarizing beam splitter 33 composed of a plane parallel plate in the optical pickup device 10 shown in FIG. 6 with respect to a substrate 46 parallel to a surface of an optical disk 6. FIG. 9a shows a state of the polarizing beam splitter 33 before a polarizing surface of the polarizing beam splitter 33 is inclined 45°. FIG. 9b shows a state of the polarizing beam splitter 33 after the polarizing surface of the polarizing beam splitter 33 is inclined 45°. Namely, in FIG. 9b, the polarizing beam splitter 33 is rotated 45° around an optical axis of incident light.

As shown in FIG. 9a, a rectangular polarizing beam splitter 33D has an angle $(90° - \theta)$ with respect to the substrate 46 such that light is incident to the polarizing beam splitter at an incident angle $\theta$. One side 33a of the polarizing beam splitter 33D is perpendicular to an optical axis of the incident light and comes in contact with the substrate 46. When this polarizing beam splitter 33D is rotated 45° around the optical axis, the one side 33a and a side of the polarizing beam splitter opposite to this one side 33a are inclined 45° with respect to the substrate 46 as shown in FIG. 9b.

For example, as shown in FIG. 10, a holder 47 for supporting the polarizing beam splitter 33D has a complicated shape formed such that the holder 47 has a through hole 47a for transmitted light. Accordingly, processing cost of the holder 47 is increased and the polarizing beam splitter 33D is unstably held by the holder 47.

Figure 7:
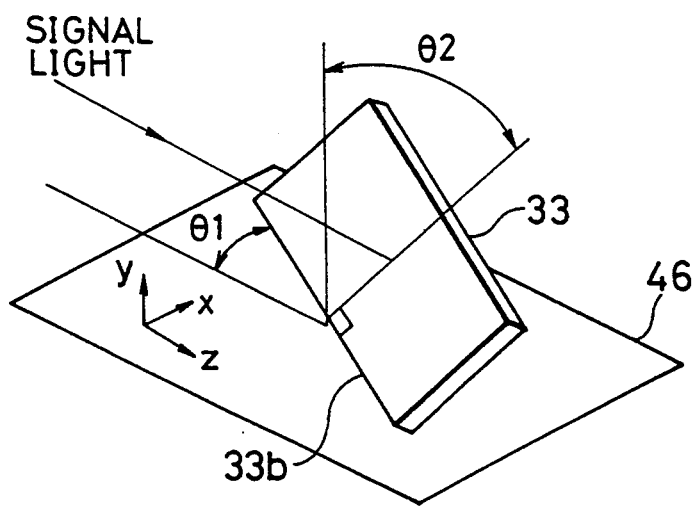
FIG. 7 is a perspective view showing an arrangement of the polarizing beam splitter in the present invention.

Therefore, as shown in FIG. 7, the polarizing beam splitter 33 is formed in a rectangular shape. Further, one side 33b of the polarizing beam splitter 33 comes in contact with the substrate 46 such that the one side 33b is inclined a first angle $\theta 1$ with respect to the optical axis as provided by the following first formulas.

$$\theta 1 = 90° - \tan^{-1}(\tan\theta / \sqrt{2})$$

$$\theta 2 = \sin^{-1}(\sin\theta / \sqrt{2})$$

Further, the polarizing beam splitter 33 is arranged such that a parallel plane of the polarizing beam splitter is inclined a second angle $\theta 2$ provided by the above first formulas with respect to a normal line of the substrate 46. These first and second angles $\theta 1$ and $\theta 2$ are calculated as follows.

As shown in FIG. 7, a Z-axis is set to an optical axis direction of signal light from an origin on the substrate 46. A Y-axis is set to a direction of the normal line of the substrate 46. An X-axis is set to a direction perpendicular to the Z-axis on the substrate 46. In such a rectangular coordinate system, a normal line vector of a plane (as a surface of the polarizing beam splitter) parallel to the X-axis and having an incident angle $\theta$ of the signal light is represented by the following ninth formula.

$$\bar{S} = (0, \sin\theta, -\cos\theta)$$

When this plane is rotated 45° around the Z-axis, the normal line vector is represented by the following tenth formula.

$$\bar{S}' = (-\sin\theta \cdot \sin 45°, \sin\theta \cdot \cos 45°, -\cos\theta)$$

An intersecting line of this plane rotated 45° and the substrate (y=0) and an angle $\alpha$ formed between this intersecting line and the Z-axis are respectively represented and calculated by the following eleventh and twelfth formulas.

$$-x(\sin\theta \cdot \sin 45°) - z \cdot \cos\theta = 0$$
$$\therefore x(\sin\theta \cdot \sin 45°) = -z \cdot \cos\theta$$

$$\tan\alpha = x/z = -\cos\theta/(\sin\theta \cdot \sin 45°)$$
$$= -1/(\tan\theta \cdot \sin 45°)$$

$$\therefore \alpha = \tan^{-1}\{-1/(\tan\theta \cdot \sin 45°)\}$$
$$= \tan^{-1}(\tan\theta \cdot \sin 45°) - 90°$$

The first angle $\theta 1$ provided by the above first formulas is an absolute value of the angle $\alpha$ and is calculated by the following thirteenth formula.

$$\theta 1 = 90° - \tan^{-1}(\tan\theta \cdot \sin 45°)$$
$$= 90° - \tan^{-1}(\tan\theta/\sqrt{2})$$

A cosine of an angle $\beta$ formed between the Y-axis and a normal line of the plane rotated 45° is provided as an inner product between the normal line vector of the plane represented by the above tenth formula and a unit vector j (y=1) in a direction of the Y-axis. This cosine is calculated by the following fourteenth formula.

$$\cos\beta = \bar{S}' \cdot j = \sin\theta \cdot \cos 45°$$
$$\therefore \beta = \cos^{-1}(\sin\theta \cdot \cos 45°)$$

This angle $\beta$ is an angle formed between the Y-axis and the normal line of the plane rotated 45°. The second angle $\theta 2$ represented by the first formulas is an angle formed between the Y-axis and a plane. Accordingly, the second angle $\theta 2$ is provided by the following fifteenth formula.

$$\theta 2 = 90° - \beta$$
$$= 90° - \cos^{-1}(\sin\theta \cdot \cos 45°)$$
$$= \sin^{-1}(\sin\theta/\sqrt{2})$$

As can be seen from the above first formulas obtained from the above thirteenth and fifteenth formulas, the first angle $\theta 1$ and the second angle $\theta 2$ are determined by only the incident angle $\theta$ set in advance. The following Table 2 shows values of the first angle $\theta 1$ and the second angle $\theta 2$ when the incident angle $\theta$ is changed every 5° in a range from 60° to 75°.

TABLE 2

| $\theta$ | $\theta 1$ | $\theta 2$ |
|---|---|---|
| 60° | 39.23° | 37.76° |

TABLE 2-continued

| $\theta$ | $\theta 1$ | $\theta 2$ |
|---|---|---|
| 65° | 33.40° | 39.86° |
| 70° | 27.24° | 41.64° |
| 75° | 20.75° | 43.08° |

Figure 8:
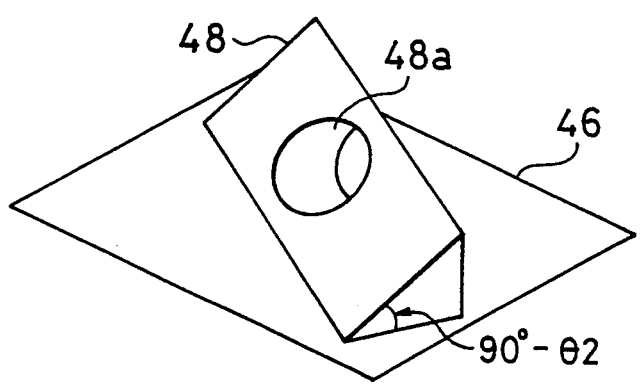
FIG. 8 is a perspective view showing one example of a holder for supporting the polarizing beam splitter shown in FIG. 7.

For example, as shown in FIG. 8, if the polarizing beam splitter 33 is arranged as mentioned above, the holder 48 has a very simple shape in which a slanting surface of the holder 48 is inclined (90°−$\theta 2$) with respect to a bottom face of the holder 48 coming in contact with the substrate 46. Accordingly, cost of the holder 48 is very reduced in comparison with the holder 47 shown in FIG. 10 even when a through hole 48a for transmitted light is disposed in the holder 48.

As can be seen from the holder 47 shown in FIG. 10, the polarizing beam splitter 33 does not come in point contact with the substrate 46 in a corner portion, but comes in line contact with the substrate 46 on one side 33b at an assembling time. Accordingly, the polarizing beam splitter 33 is very stably held by the holder so that a height of the polarizing beam splitter 33 is reduced. Therefore, the optical pickup device can be made compact and light in weight.

As explained above, the polarizing beam splitter is constructed by a plane parallel glass plate with reduced cost and light in weight and can be used instead of the general polarizing beam splitter constructed by prisms stuck to each other. Accordingly, the polarizing beam splitter can be accurately held by a holder with reduced cost even when a polarizing surface of the polarizing beam splitter is inclined 45° with respect to a polarizing plane of incident signal light.

The following brief explanation relates to operations of polarizing beam splitters 58 and 15 as a signal light separating means for separating incident and signal lights from each other in the first and second embodiments. The polarizing beam splitters 58 and 15 are called "PBSs" in the following description. Further, the following brief explanation relates to operations of polarizing beam splitters 63 and 33 for separating signal light into p and s polarized light components to detect a reproducing signal. The polarizing beam splitters 63 and 33 are called "PBSd" in the following description.

The PBSs have polarizing characteristics in which transmittance of a p-polarized light component is approximately equal to 100% and reflectivity of an s-polarized light component is equal to 70% and transmittance of the s-polarized light component is equal to 30%. The PBSd have polarizing characteristics in which transmittance of a p-polarized light component and reflectivity of an s-polarized light component are approximately equal to 100%. Accordingly, if the polarizing plane of a linearly polarized laser beam emitted from a laser diode is in conformity with that of the s-polarized light component of the PBSs, 70% of output light of the laser diode is irradiated onto an optical disk surface as incident light.

Figure 11A:
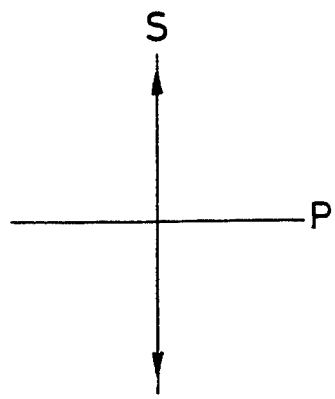
FIGS. 11a, 11b and 11c are vector diagrams for explaining an operation of the polarizing beam splitter as a means for separating signal light.
Figure 11B:
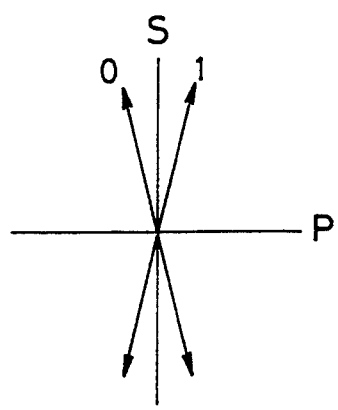
Figure 11C:
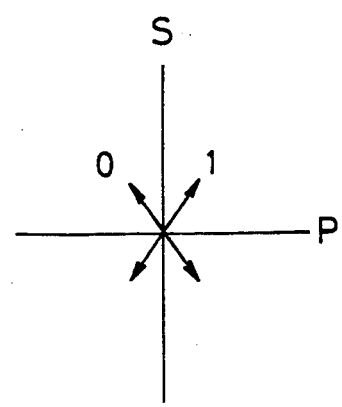
Figure 12C:
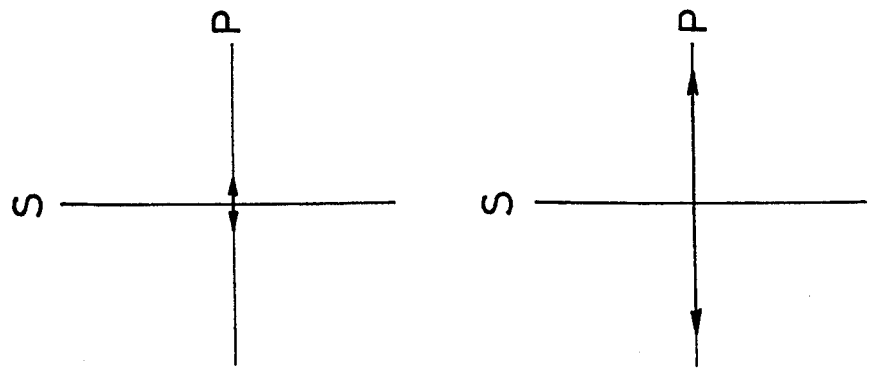
FIGS. 12a, 12b and 12c are vector diagrams for explaining an operation of the polarizing beam splitter which separates signal light having a polarizing plane inclined 45° into p and s polarized light components.
Figure 12B:
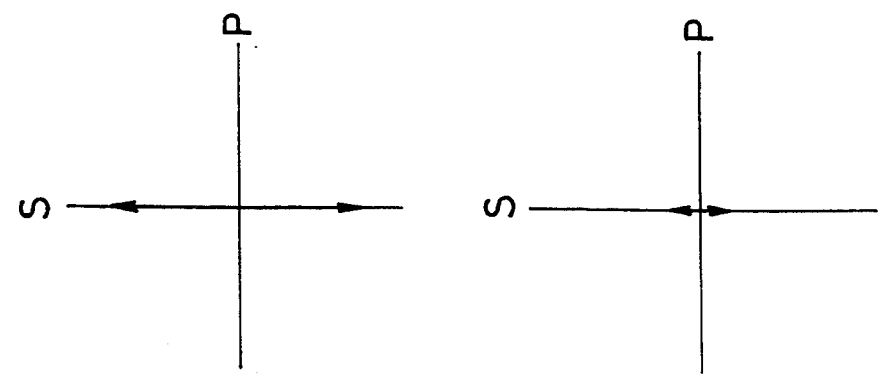
Figure 12A:
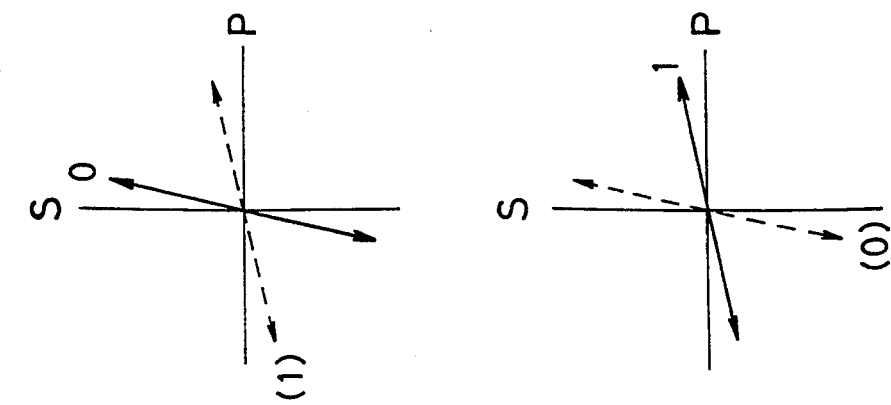

FIGS. 11 and 12 are vector diagrams showing respective intensities of p and s polarized light components on axes of abscissa and ordinate with polarizing planes of the PBSs and the PBSd as references. FIGS. 11a, 11b and 11c show one examples of light incident to an optical disk, light reflected on the optical disk, and signal light transmitted through the PBSs. FIGS. 12a, 12b and 12c show one examples of signal light incident to the PBSd, light reflected on the PBSd, and light transmitted through the PBSd when data show value 0 and 1.

The incident light shown in FIG. 11a is composed of only an s-polarized light component. A polarizing plane of this incident light is slightly rotated in a positive or negative direction in accordance with data=0 or 1 recorded to the optical disk. As shown in FIG. 11b, this incident light is changed to reflected light slightly including a p-polarized light component. When this reflected light is transmitted through the PBSs, approximately 100% of the p-polarized light component is transmitted through the PBSs, but only 30% of the s-polarized light component is transmitted through the PBSs so that an amount of the reflected light is reduced. However, as shown in FIG. 11c, the reflected light is changed to signal light having an angle of rotation increased in accordance with the reduction in amount of the reflected light.

As shown in FIG. 12a, signal light is incident to a polarizing surface of the PBSd at an incident angle of 45°. Accordingly, as shown in FIG. 12b, the intensity of light reflected on the PBSd as an s-polarized component of the signal light is strong when data=0 and is weak when data=1. In contrast to this, as shown in FIG. 12c, the intensity of light transmitted through the PBSd as a p-polarized component of the signal light is weak when data=0 and is strong when data=1. Accordingly, a reproducing signal of recorded information is obtained in a state in which data=0 if s>p and data=1 if s<p.

As explained above, in the embodiments of the present invention, an amount of light transmitted through a signal light separating means is lost as in the general optical pickup device until the transmitted light is changed to signal light. However, different from the general optical pickup device, no signal light is separated many times after the transmitted light is changed to the signal light. Control and reproducing signals are obtained by one separation of the signal light so that distribution efficiency of the signal light is greatly improved.

As mentioned above, in accordance with the present invention, it is possible to prevent an error in operation of an optical pickup device and an error in reading of information by improving distribution efficiency of signal light. Further, a polarizing beam splitter has a simplified structure and cost of the optical pickup device is reduced and the optical pickup device can be made compact and light in weight.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical pickup device for forming a beam spot on a surface of an optical information recording medium by converging a laser beam and making a light beam reflected from the optical information recording medium incident to a polarizing beam splitter as a signal light comprising:

said optical pickup device reproducing a recorded signal by comparing an amount of light transmitted through said polarizing beam splitter with an amount of light reflected by the polarizing beam splitter with respect to said signal light; and said polarizing beam splitter being constructed by a transparent plane parallel plate including an optical evaporation film arranged on one surface thereof and having polarizing characteristics in which transmittance of a p-polarized light component and reflectivity of an s-polarized light component are respectively equal to approximately one at an incident angle $\theta$ set in advance, wherein said polarizing beam splitter constructed by the transparent plane parallel plate is formed in a rectangular shape and the optical pickup device has a reflecting member for reflecting the signal light reflected from said surface of the optical information recording medium such that said optical axis of the signal light is parallel to the surface of the optical information recording medium;

a first angle $\theta 1$ and a second angle $\theta 2$ are respectively set by the following formulas in accordance with said incident angle $\theta$ of the reflected light of the reflecting member incident to said polarizing beam splitter, $$\theta 1 = 90° - \tan^{-1}(\tan\theta/\sqrt{2})$$

$$\theta 2 = \sin^{-1}(\sin\theta/\sqrt{2})$$

said polarizing beam splitter is arranged such that one side of the rectangular polarizing beam splitter is parallel to said surface of the optical information recording medium and is inclined said first angle $\theta 1$ with respect to said optical axis of the reflected light of said reflecting member, and a parallel plane of the polarizing beam splitter is inclined said second angle $\theta 2$ with respect to a normal line of said surface of the optical information recording medium.

2. An optical device as claimed in claim 1, wherein said optical evaporation film is formed on a first surface of said polarizing beam splitter onto which the signal light is incident.

3. An optical pickup device as claimed in claim 1, wherein said optical evaporation film is formed on a first surface of said polarizing beam splitter onto which the signal light is incident, and an antireflection film is formed on a second surface of the polarizing beam splitter and reflectivity of the p-polarized light component of the antireflection film is approximately equal to zero at said incident angle $\theta$.

4. A method for reproducing a signal recorded on an optical information recording medium comprising the steps of:

forming a beam spot on a surface of said optical information recording medium by converging a laser beam;

making a light beam reflected from the optical information recording medium incident to a polarizing beam splitter as a signal light; and comparing an amount of light transmitted through said polarizing beam splitter with an amount of light reflected by the polarizing beam splitter with respect to said signal light;

wherein said polarizing beam splitter being constructed by a transparent plane parallel plate including an optical evaporation film arranged on one surface thereof and having polarizing characteristics in which transmittance of a p-polarized light component and reflectivity of an s-polarized light component are respectively equal to approximately one at an incident angle $\theta$ set in advance, said polarizing beam splitter constructed by the transparent plane parallel plate is formed in a rectangular shape and the optical pickup device has a reflecting member for reflecting the signal light reflected from said surface of the optical information recording medium such that an optical axis of the signal light is parallel to the surface of the optical information recording medium;

a first angle $\theta 1$ and a second angle $\theta 2$ are respectively set by the following formulas in accordance with said incident angle $\theta$ of the reflected light of the reflecting member incident to said polarizing beam splitter, $$\theta 1 = 90° - \tan^{-1}(\tan\theta/\sqrt{2})$$

$$\theta 2 = \sin^{-1}(\sin\theta/\sqrt{2})$$

said polarizing beam splitter is arranged such that one side of the rectangular polarizing beam splitter is parallel to said surface of the optical information recording medium and is inclined said first angle $\theta 1$ with respect to said optical axis of the reflected light of said reflecting member, and a parallel plane of the polarizing beam splitter is inclined said second angle $\theta 2$ with respect to a normal line of said surface of the optical information recording medium.

* * * * *